United States Patent
Okazaki

(10) Patent No.: US 8,265,179 B2
(45) Date of Patent: Sep. 11, 2012

(54) WIRELESS COMMUNICATION SYSTEM AND COMMUNICATION APPARATUS

(75) Inventor: Akihiro Okazaki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 823 days.

(21) Appl. No.: 11/994,853

(22) PCT Filed: Aug. 23, 2005

(86) PCT No.: PCT/JP2005/015278
§ 371 (c)(1),
(2), (4) Date: Jan. 7, 2008

(87) PCT Pub. No.: WO2007/023530
PCT Pub. Date: Mar. 1, 2007

(65) Prior Publication Data
US 2008/0205455 A1     Aug. 28, 2008

(51) Int. Cl.
*H04K 1/10* (2006.01)
(52) U.S. Cl. ........ 375/260; 375/219; 375/220; 375/221; 375/316; 375/295; 375/285; 375/346; 375/348
(58) Field of Classification Search .................. 375/260, 375/219, 220, 221, 316, 295, 285, 346, 348
See application file for complete search history.

(56) References Cited

U.S. PATENT DOCUMENTS

| 2003/0123559 A1* | 7/2003 | Classon et al. ................ 375/260 |
|---|---|---|
| 2003/0147358 A1 | 8/2003 | Hiramatsu et al. |
| 2004/0233838 A1* | 11/2004 | Sudo et al. .................... 370/208 |
| 2005/0180313 A1* | 8/2005 | Kim et al. ...................... 370/208 |
| 2005/0180354 A1* | 8/2005 | Cho et al. ...................... 370/328 |
| 2006/0013325 A1* | 1/2006 | Agrawal et al. ............... 375/260 |
| 2006/0109919 A1* | 5/2006 | Nieto ............................ 375/260 |
| 2006/0115012 A1* | 6/2006 | Sadowsky et al. ............. 375/260 |

FOREIGN PATENT DOCUMENTS

| CN | 1655543 A | 8/2005 |
|---|---|---|
| EP | 1 298 948 A1 | 4/2003 |
| EP | 1 395 013 A1 | 3/2004 |
| EP | 1 605 619 A1 | 12/2005 |
| EP | 1 641 160 A1 | 3/2006 |

(Continued)

OTHER PUBLICATIONS

Akihiro Okazaki, et al., "Frequency Domain Equalization of Multipath Signals With Insufficient Guard Interval", Information Technology R & D Center, B-5-21, p. 470, 2005. (with partial English translation).

(Continued)

*Primary Examiner* — Siu Lee
(74) *Attorney, Agent, or Firm* — Oblon, Spivak, McClelland, Maier & Neustadt, L.L.P.

(57) ABSTRACT

A data-transmission-side communication apparatus includes a mapping unit that executes a mapping for a data sub-carrier based on a multipath delay time in a transmission path and a guard-band adding unit that changes an amount of a guard band to be added to a signal on the data sub-carrier depending on information on the guard band obtained based on the multipath delay time. A data-reception-side communication apparatus includes an equalizing unit that suppresses a multipath exceeding a guard interval based on the information on the guard band and a demapping unit that executes a demapping for an equalized signal based on the multipath delay time.

14 Claims, 9 Drawing Sheets

FOREIGN PATENT DOCUMENTS

| | | |
|---|---|---|
| JP | 11-215095 | 8/1999 |
| JP | 2001-28577 | 1/2001 |
| JP | 2001 345780 | 12/2001 |
| JP | 2002-141879 | 5/2002 |
| JP | 2002 374223 | 12/2002 |
| JP | 2003-152597 | 5/2003 |
| JP | 2003-188847 | 7/2003 |
| JP | 1463563 A | 12/2003 |
| JP | 2004-135302 | 4/2004 |
| JP | 2004-207901 | 7/2004 |
| JP | 2005-27107 | 1/2005 |
| JP | 2006-311234 | 11/2006 |
| WO | WO 01/52468 A1 | 7/2001 |
| WO | WO 2004/077712 A1 | 9/2004 |
| WO | WO 2005/013525 A1 | 2/2005 |
| WO | WO 2005/074178 A1 | 8/2005 |
| WO | WO 2005/076558 A1 | 8/2005 |
| WO | WO 2006/092877 A1 | 9/2006 |

OTHER PUBLICATIONS

Steffen Trautmann, et al., "Perfect Equalization for DMT Systems Without Guard Interval", IEEE Journal on Selected Areas in Communications, vol. 20, No. 5, pp. 987-996, 2002.

Takashi Baba, et al., "A Study on Block Control applied Multilevel Transmit Power Control Scheme for OFDM based Adaptive Modulation Systems", IEICE Transactions on Information and Systems, Mar. 3, 2003, 4 pages (with English Abstract), <URL: http://ci.nii.ac.jp/lognavi?name=nels&lang=jp&type=pdf&id=ART0003675680>.

Office Action issued Feb. 17, 2011 in China Application No. 200580051094.4.

* cited by examiner

FIG.6

| DELAY-TOLERANT PERFORMANCE | G1 | GB | NUMBER OF SUB-CARRIERS | ENCODING RATE | INFORMATION TRANSMISSION RATE |
|---|---|---|---|---|---|
| $L_{GI}$ | $L_{GI}$ | 0 | N | R | W |
| $L_{GI}+1$ | $L_{GI}$ | 1 | N-1 | R | W×(N-1)/N |
| $L_{GI}+2$ | $L_{GI}$ | 2 | N-2 | R | W×(N-2)/N |
| $L_{GI}+3$ | $L_{GI}$ | 3 | N-3 | R | W×(N-3)/N |

FIG.8

| DELAY-TOLERANT PERFORMANCE | G1 | GB | NUMBER OF SUB-CARRIERS | ENCODING RATE | INFORMATION TRANSMISSION RATE |
|---|---|---|---|---|---|
| $L_{GI}$ | $L_{GI}$ | 0 | N | R | W |
| $L_{GI}+1$ | $L_{GI}$ | 1 | N-1 | $R \times N/(N-1)$ | W |
| $L_{GI}+2$ | $L_{GI}$ | 2 | N-2 | $R \times N/(N-2)$ | W |
| $L_{GI}+3$ | $L_{GI}$ | 3 | N-3 | $R \times N/(N-3)$ | W |

WIRELESS COMMUNICATION SYSTEM AND COMMUNICATION APPARATUS

TECHNICAL FIELD

The present invention relates to a radio communication system employing a multi-carrier modulation/demodulation method, and more particularly, to a communication apparatus capable of working in a communication environment in which a multipath delay time varies.

BACKGROUND ART

As an example of a conventional radio communication method, there is a multi-carrier modulation/demodulation method as typified by an OFDM (orthogonal frequency division multiplexing) method and a DMT (discrete multi-tone) method. The multi-carrier modulation/demodulation method is used, for example, in a wireless LAN or an ADSL, and is a method of transmitting a plurality of frequencies by allocating the frequencies to orthogonal carriers. In the method, a guard interval or a cyclic prefix is used to eliminate an effect of a delayed wave (GB) caused by, for example, a condition of a transmission path between a transmitter and a receiver. The receiver eliminates the effect of the delayed wave in the guard interval, for example, by applying an FFT to an OFDM symbol from which the guard interval is removed, and thereby demodulating data.

In the OFDM method, when a delayed wave exceeding the guard interval arrives, an intersymbol interference is generated, and thus overall characteristics is degraded significantly. The above problem can be solved by adding a guard interval longer than a delay time estimated by the transmitter side. However, with this process, an overhead of the guard interval increases, and thereby decreasing a transmitting efficiency.

In a cellular system, for example, if a terminal is located far from a base station, a delay time is lengthened. On the other hand, if the terminal is located near the base station, the delay time is shortened. In other words, in the cellular system, a length of an appropriate guard interval depends on a location of the terminal or an environment.

An example of a conventional technology for a case where the delayed wave exceeding the guard interval arrives or a case where a length of the appropriate guard interval depends on a location of the terminal or an environment, as described above, is "an OFDM communication system and an OFDM communication method" disclosed in patent document 1. In the technology disclosed in patent document 1, a guard interval length, which is used to be a fixed length before, is adaptively controlled depending on a multipath delay time, and thereby achieving the maximum transmitting efficiency.

[Patent document 1] Japanese Patent Application Laid-Open No. 2002-374223

DISCLOSURE OF INVENTION

Problem to be Solved by the Invention

A problem with patent document 1 is explained below. FIG. 9 is a schematic diagram of an example of a signal in a case where a variable guard interval is used. Specifically, it shows a signal in a case where the multipath delay time varies. In the figure, a horizontal axis represents a time (t), an upper portion of a vertical axis represents a multipath delay time (a normalized max delay time) ($L_C$), and a lower portion of the vertical axis represents a sub-carrier in a frequency direction. As shown in FIG. 9, it can be found that a degree of the multipath delay time varies in such a way that "medium→small→large" with time. Also, it can be found that the signal is composed of "Sym" including data information and the guard interval "GI" (a guard interval length "$L_{GI}$"), satisfying "$L_C \leq L_{GI}$", and "$L_{GI}$" varies with "$L_C$". However, according to the conventional technology disclosed in patent document 1, an OFDM symbol length varies due to the adaptive control, and thus a hardware configuration becomes complicated.

The present invention has been achieved to solve the above problems in the conventional technology, and an object of the present invention is to provide a communication apparatus capable of coping with a variation of the multipath delay time with a simple hardware configuration.

Means for Solving Problem

To solve the above problems and to achieve the object, a radio communication system according to the present invention employs a multi-carrier modulation/demodulation method. A data-transmission-side communication apparatus includes a mapping unit that executes a mapping process with respect to a data sub-carrier based on a multipath delay time in a transmission path obtained by a predetermined estimating process, and a guard-band adding unit that varies an amount of a guard band to be added to a signal on the data sub-carrier depending on information on the guard band obtained based on the multipath delay time. A data-reception-side communication apparatus includes an equalizing unit that suppresses a multipath exceeding a guard interval (including a case where the guard interval is not added) based on the information on the guard band obtained based on the multipath delay time, and a demapping unit that executes a demapping process with respect to an equalized signal based on the multipath delay time.

Effect of the Invention

In a radio communication system according to the present invention, an amount of a guard band is configured to vary depending on a multipath delay time in a transmission path. Therefore, it is possible to cope with a variation of the multipath delay time with a simple hardware configuration without changing a symbol length.

BRIEF DESCRIPTION OF DRAWINGS

FIG. 6 is a schematic diagram of an example of a modulation and coding scheme used in a MCS-control module.

FIG. 8 is a schematic diagram of another example of the modulation and coding scheme used in the MCS-control module.

EXPLANATIONS OF LETTERS OR NUMERALS

Figure 1:
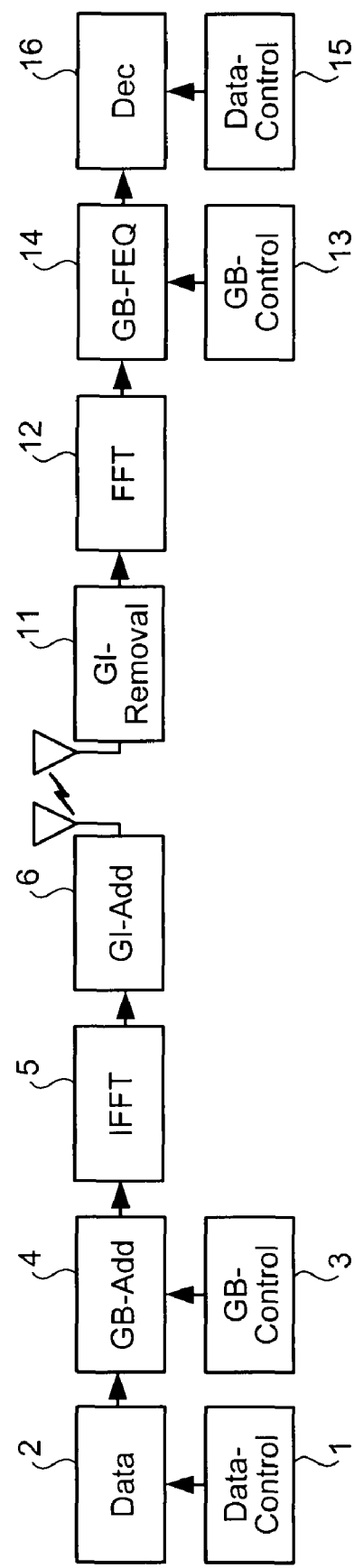
FIG. 1 is a schematic diagram of an example of a configuration of a radio communication system according to the present invention.

1, 1*a*, 15, 15*a* Data-control module
Data module
3, 3*a*, 13, 13*a* GB-control module
4 GB-add module
5 IFFT module
6 GI-add module
7*a*, 17*a* MCS-control module
8*b*, 18*b* Rate-control module
11 GI-removal module
12 FFT module
14 GB-FEQ module
16 Dec module

BEST MODE(S) FOR CARRYING OUT THE INVENTION

Exemplary embodiments of a radio communication system and a communication apparatus according to the present invention are explained in detail below with reference to the accompanying drawings. The present invention is not limited to the embodiments.

First Embodiment

FIG. 1 is a schematic diagram of an example of a configuration of a radio communication system according to the present invention, i.e., an example of configurations of a data-transmission-side communication apparatus and a data-reception-side communication apparatus. The transmission-side communication apparatus (corresponding to a modulator) includes a Data-control module 1, a Data module 2, a GB-control module 3, a GB-add module 4, an IFFT module 5, and a GI-add module 6. The reception-side communication apparatus (corresponding to a demodulator) includes a GI-removal module 11, an FFT module 12, a GB-control module 13, a GB-FEQ module 14, a Data-control module 15, and a Dec module 16.

A basic operation of each of the modules included in the radio communication system is briefly explained below. The Data-control modules 1 and 15 instruct a position and an amount of a data sub-carrier. The Data module 2 encodes data to be transmitted, and maps the encoded data in the data sub-carrier located on a frequency domain in accordance with an instruction from the Data-control module 1. The GB-control modules 3 and 13 instruct a type, a position, and an amount of a guard band (GB). The GB-add module 4 adds the guard band to the data sub-carrier output from the Data-control module 1 in accordance with an instruction from the GB-control module 3. The IFFT module 5 converts a frequency-domain signal into a time-domain signal. The GI-add module 6 adds a guard interval to the time-domain signal. The GI-removal module 11 removes the guard interval from the received signal. The FFT module 12 converts the time-domain signal into a frequency-domain signal. The GB-FEQ module 14 performs a frequency equalization by using the guard band in accordance with an instruction from the GB-control module 13 to suppress a delayed wave exceeding the guard interval. The Dec module 16 demodulates the data sub-carrier (a demapping process) in accordance with an instruction from the Data-control module 15, and performs a decoding process including an error correction.

Subsequently, a characteristic operation of the present embodiment is explained below. In the present embodiment, the Data-control module 1 and the GB-control module 3 control a data sub-carrier and a guard band depending on a multipath delay time in a transmission path. Specifically, for example, in a case of a TDD (time division duplex) system, the multipath delay time in the transmission path is estimated by the reception side based on a received signal. In a case of an FDD (frequency division duplex) system, the multipath delay time in the transmission path is estimated by the transmission side, and the estimated multipath delay time is fed back to the reception side. Then, by using such characteristics that a communication quality decreases in accordance with an increase of the multipath delay in the transmission path, the data sub-carrier and the guard band are controlled based on parameters for estimating communication qualities such as a frame error rate and a least-squares distance.

Incidentally, the above-mentioned guard band is a generic name for a sub-carrier which transmitting content is known to the reception side, and corresponds to a null carrier that does not transmit data, a pilot carrier that transmits fixed data, and the like.

The GB-FEQ is a frequency equalizing apparatus that suppresses a multipath exceeding the guard interval by using the guard band; for example, the one described in A. Okazaki et al., "Frequency Domain Equalization of Multipath Signals with Insufficient Guard Interval", Proceedings of the IEICE (Institute of Electronics, Information and Communication Engineers) General Conference B-5-21, 2005 can be used. The GB-FEQ module 14 can extend the suppressible multipath delay time by increasing an amount of the guard band.

Subsequently, a process of controlling the guard band is explained concretely. The radio communication system according to the present embodiment includes the modulator and the demodulator as shown in FIG. 1. In the modulator, the GB-control module 3 instructs a type and a position of the guard band, and an amount of the guard band appropriate for the multipath delay time in the transmission path, and the GB-add module adds the guard band in accordance with an instruction from the GB-control module 3. On the other hand, in the demodulator, the GB-control module 13 instructs a type, a position, and an amount of the guard band, and the GB-FEQ module 14 realizes a frequency equalization by using the guard band in accordance with an instruction from the GB-control module 13.

Figure 2:
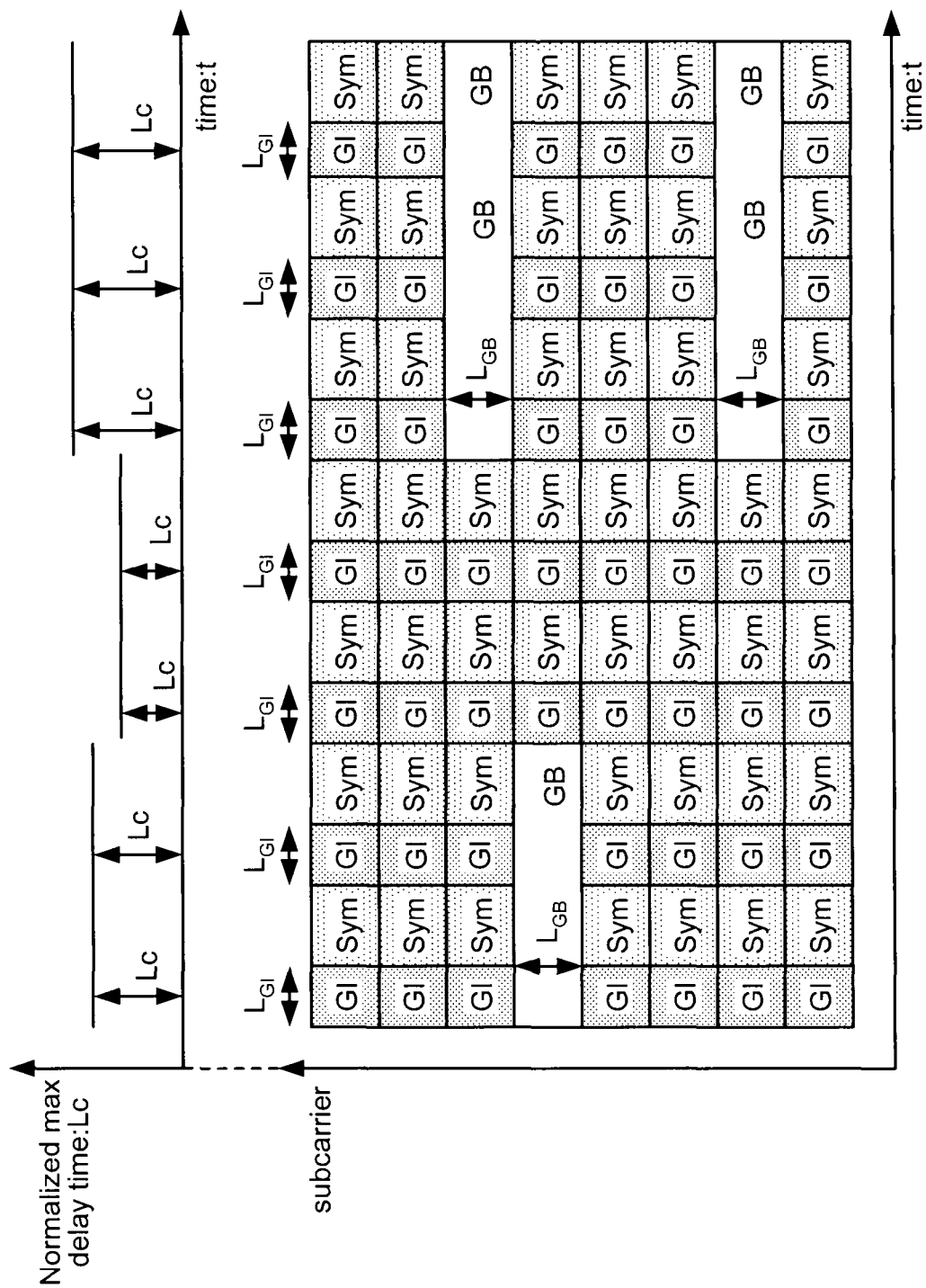
FIG. 2 is a schematic diagram of an example of a signal to which a guard band is added.

FIG. 2 is a schematic diagram of an example of a signal to which the guard band is added. For example, it shows a signal in a case where the multipath delay time varies. In the diagram shown in FIG. 2, a horizontal axis represents a time (t), and an upper portion of a vertical axis represents the multipath delay time (LC), and then a lower portion of the vertical axis represents a sub-carrier in a frequency direction. As represented in the upper portion of the diagram shown in FIG. 2, a degree of the multipath delay time varies in such a way that "medium→small→large" with time.

At this time, in the present embodiment, as represented in the lower portion of the diagram shown in FIG. 2, the signal is composed of "Sym" including data information, the guard interval "GI" (a guard interval length "$L_{GI}$"), and the guard band "GB" (the number of the guard bands "$L_{GB}$"). The guard band is inserted depending on the multipath delay time "$L_C$" so as to meet a condition of "$L_C \leq L_{GI} + L_{GB}$". In the case shown in FIG. 2, as one example, the guard band is not inserted when a degree of the multipath delay time is "small", and one number of the guard band is inserted when a degree of the multipath delay time is "medium", and then two numbers of the guard bands are inserted when a degree of the multipath delay time is "large".

In this manner, in the present embodiment, an amount of the guard band is configured to vary depending on the multipath delay time in the transmission path. Therefore, it is possible to cope with a variation of the multipath delay time with a simple hardware configuration without changing a symbol length.

Furthermore, in the present embodiment, for example, even when the GI-add module 6 does not add the guard interval, the multipath can be suppressed with the guard band added by the GB-add module 4.

Second Embodiment

In a second embodiment, an OFDMA (orthogonal frequency division multiplex access) method is applied to the above-mentioned process of "varying an amount of the guard band depending on the multipath delay time", which is a characteristic process in the first embodiment. Incidentally, a system configuration in the present embodiment is identical to that is in the first embodiment as shown in FIG. 1. A process different from that is performed in the first embodiment is explained below.

Figure 3:
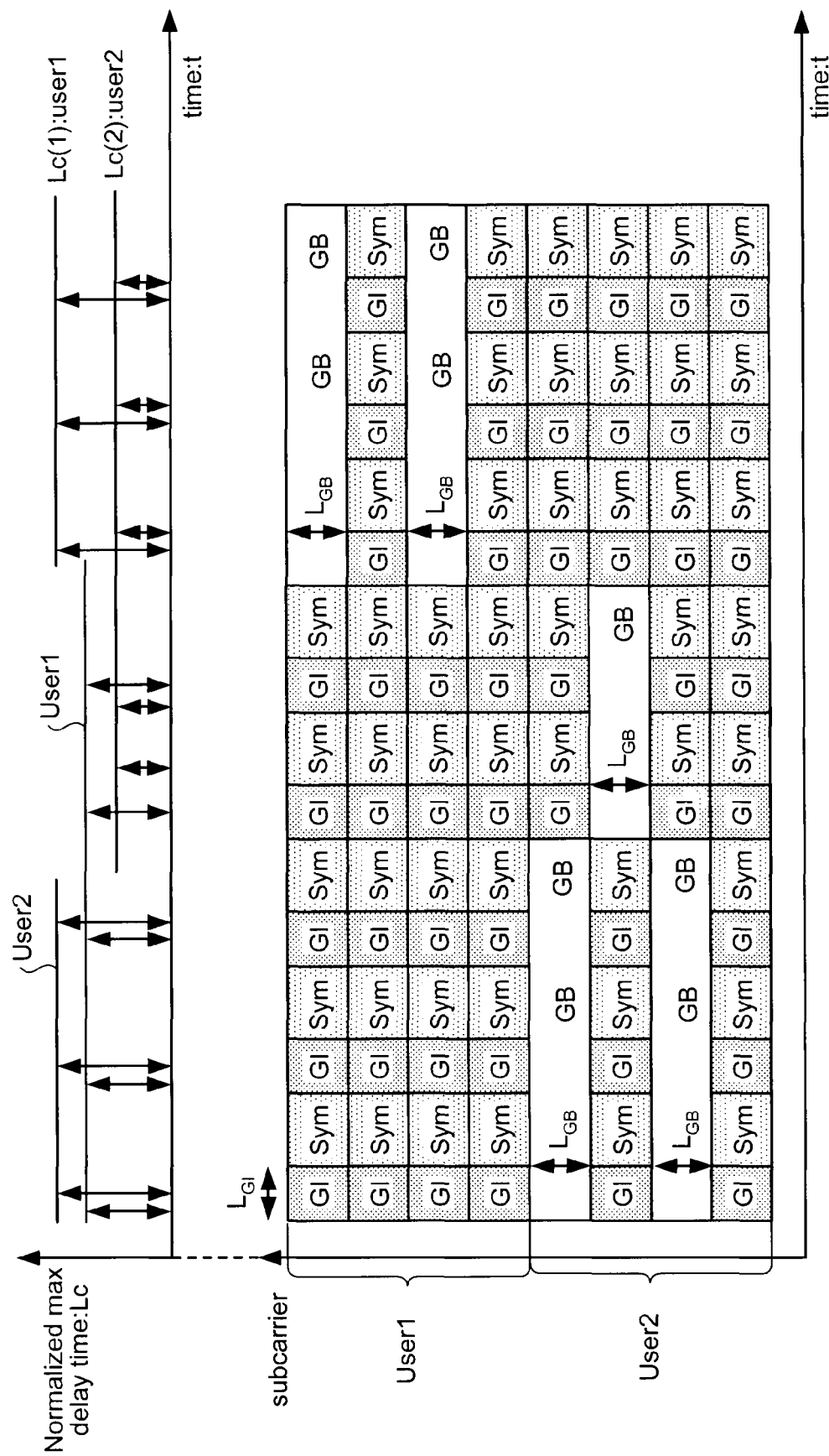
FIG. 3 is a schematic diagram of another example of the signal to which the guard band is added.

FIG. 3 is a schematic diagram of an example of a signal to which the guard band is added. For example, it shows a signal in a case where the multipath delay time varies. In the present embodiment, as one example, it is assumed that data is frequency-division multiplexed into eight numbers of sub-carriers, and the user 1 and the user 2 respectively have the multipath delay time different from each other.

For example, in the present embodiment, to equalize the maximum amounts of the multipath delay time for each user that varies with time, a sufficient amount of the guard band is inserted. In the case shown in FIG. 3, the maximum amount of the multipath delay time $L_C$ varies in such a way that "large→medium→large", so that the number of the guard bands $L_{GB}$ to be added varies in such a way that "two guard bands→one guard band→two guard bands" in accordance with the variation of the maximum amount of the multipath delay time $L_C$.

In this manner, in the present embodiment, by the application of the OFDMA method, an amount of the guard band is configured to vary depending on the maximum amounts of the multipath delay time for each of multiple users. Consequently, it is possible to cope with a variation of the multipath delay time with a simple hardware configuration without changing a symbol length.

Third Embodiment

In a third embodiment, an OFCDM (orthogonal frequency and code division multiplexing) method or a MC-CDMA (multi-carrier-code division multiple access) method is applied to the above-mentioned process of "varying an amount of the guard band depending on the multipath delay time", which is a characteristic process in the first embodiment. Incidentally, a system configuration in the present embodiment is identical to that is in the first embodiment as shown in FIG. 1. A process different from that is performed in the first embodiment is explained below.

Figure 4:
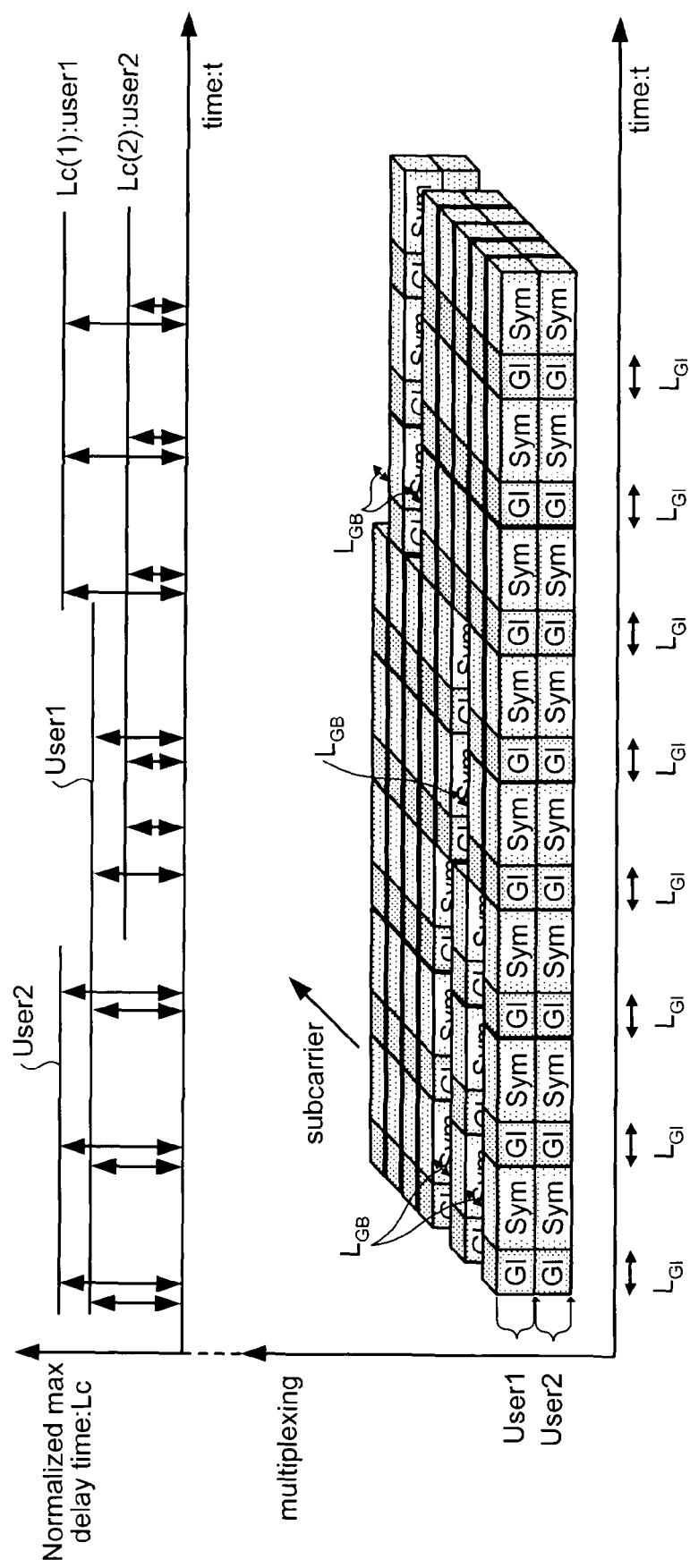
FIG. 4 is a schematic diagram of still another example of the signal to which the guard band is added.

FIG. 4 is a schematic diagram of an example of a signal to which the guard band is added. For example, it shows a signal in a case where the multipath delay time varies. In the present embodiment, as one example, it is assumed that data is code-division multiplexed into eight numbers of sub-carriers, and the user 1 and the user 2 respectively have the multipath delay time different from each other. In the diagram shown in FIG. 4, a lower portion of a vertical axis represents the number of multiplexing, and a depth represents the sub-carriers in a frequency direction.

For example, in the present embodiment, to equalize the maximum amounts of the multipath delay time for each user that varies with time, a sufficient amount of the guard band is inserted. In the case shown in FIG. 4, the maximum amount of the multipath delay time $L_C$ varies in such a way that "large→medium→large", so that the number of the guard bands $L_{GB}$ to be added varies in such a way that "two guard bands→one guard band→two guard bands" in accordance with the variation of the maximum amount of the multipath delay time $L_C$.

In this manner, in the present embodiment, by the application of the OFCDM method or the MC-CDMA method, an amount of the guard band is configured to vary depending on the maximum amounts of the multipath delay time for each of multiple users. Consequently, it is possible to cope with a variation of the multipath delay time with a simple hardware configuration without changing a symbol length.

Fourth Embodiment

Figure 5:
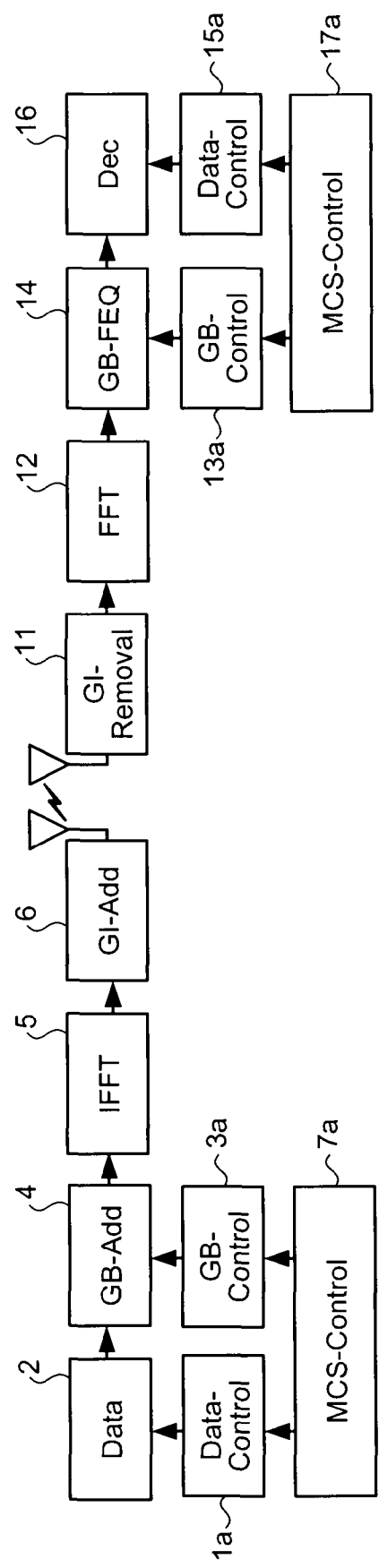
FIG. 5 is a schematic diagram of an example of a configuration of a radio communication system according to the present invention.

FIG. 5 is a schematic diagram of an example of a configuration of a radio communication system according to the present invention, i.e., an example of configurations of a data-transmission-side communication apparatus and a data-reception-side communication apparatus. The transmission-side communication apparatus (corresponding to a modulator) includes a Data-control module 1a, a GB-control module 3a, a MCS-control module 7a, the GB-add module 4, the IFFT module 5, and the GI-add module 6. The reception-side communication apparatus (corresponding to a demodulator) includes a GB-control module 13a, a Data-control module 15a, a MCS-control module 17a, the FFT module 12, the GB-FEQ module 14, and the Dec module 16. The portions identical to those in FIG. 1 for the first embodiment are denoted with the same reference numerals, and the description of those portions is omitted. A process different from that is performed in the first embodiment is explained below.

In the present embodiment, the MCS-control modules 7a and 17a are modules for instructing a MCS (modulation and coding scheme), and give an instruction on a parameter to the Data-control modules 1a and 15a and the GB-control modules 3a and 13a based on the MCS that is set up in advance. At this time, each of the MCS-control modules controls the Data-control module and the GB-control module depending on the multipath delay time in the transmission path. Specifically, for example, in a case of the TDD (time division duplex) system, the multipath delay time in the transmission path is estimated by the reception side based on a received signal. In a case of the FDD (frequency division duplex) system, the multipath delay time in the transmission path is estimated by the transmission side, and the estimated multipath delay time is fed back to the reception side. Then, by using such characteristics that a communication quality decreases in accordance with an increase of the multipath delay in the transmission path, the data sub-carrier and the guard band are indirectly controlled based on parameters for estimating communication qualities such as a frame error rate and a least-squares distance.

FIG. 6 is a schematic diagram of an example of the MCS used in the MCS-control module. In the present embodiment, to improve a delay-tolerant performance, it is controlled in such a way that the number of the sub-carriers is reduced, and the number of the guard bands increases. Incidentally, in the present embodiment, the MCS is created focused on only the number of the guard bands to make it simplified. Alternatively, it is also possible to combine a modulation and coding scheme composed of a modulation scheme and an encoding rate.

Subsequently, an operation of the communication apparatus when the process of controlling the guard band is performed is explained below with reference to the drawing. The radio communication system according to the present embodiment includes the modulator and the demodulator as shown in FIG. 5. The MCS-control modules 7a and 17a in the modulator and the demodulator respectively select the MCS adaptively depending on the multipath delay time in the transmission path. Then, based on the coding scheme, each of the MCS-control modules instructs the number of the sub-carriers to be used to the Data-control module and the number of the guard bands to be used to the GB-control module.

In this manner, in the present embodiment, to improve the delay-tolerant performance, it is configured to reduce the number of the sub-carriers and to increase the number of the guard bands. Consequently, in a case where the multipath delay time in the transmission path increases, the radio communication system according to the fourth embodiment can achieve to improve a tolerance to the multipath delay time as a trade-off for a degradation of an information transmission rate due to the reduction of the number of the sub-carriers, in addition to the same effect as that is in the first embodiment.

Fifth Embodiment

Figure 7:
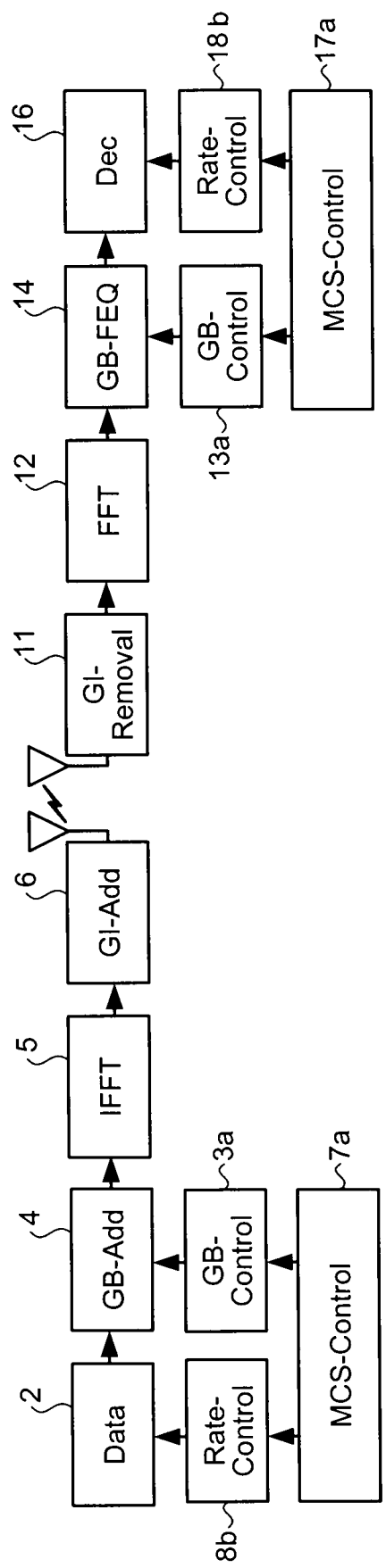
FIG. 7 is a schematic diagram of an example of a configuration of a radio communication system according to the present invention.
Figure 9:
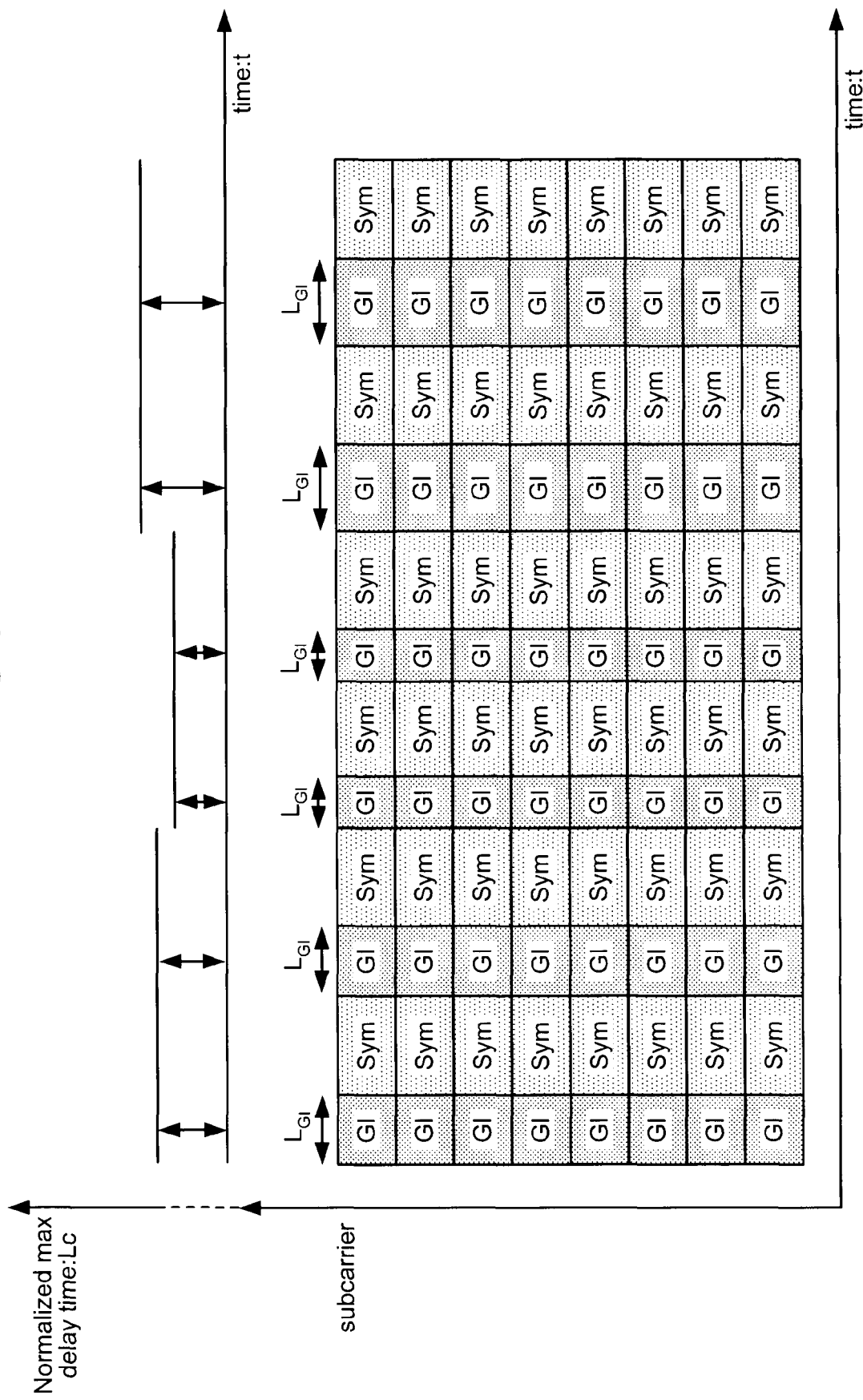
FIG. 9 is a schematic diagram of an example of a signal in a case where a variable guard interval is used.

FIG. 7 is a schematic diagram of an example of a configuration of a radio communication system according to the present invention, i.e., an example of configurations of a data-transmission-side communication apparatus and a data-reception-side communication apparatus. The transmission-side communication apparatus (corresponding to a modulator) includes a Rate-control module 8b, the GB-control module 3a, the GB-add module 4, the IFFT module 5, the GI-add module 6, and the MCS-control module 7a. The reception-side communication apparatus (corresponding to a demodulator) includes a Rate-control module 18b, the FFT module 12, the GB-control module 13a, the GB-FEQ module 14, the Dec module 16, and the MCS-control module 17a. The portions identical to those in FIG. 5 for the fourth embodiment are denoted with the same reference numerals, and the description of those portions is omitted. A process different from that is performed in the fourth embodiment is explained below.

For example, the MCS-control modules 7a and 17a give an instruction on a parameter to the Rate-control modules 8b and 18b and the GB-control modules 3a and 13a based on the MCS that is set up in advance. Then, the Rate-control modules 8b and 18b instruct an encoding rate to be used in the Data module 2 and the Dec module 16 based on the instruction.

FIG. 8 is a schematic diagram of an example of the MCS used in the MCS-control module. In the present embodiment, to improve a delay-tolerant performance, it is configured to increase the encoding rate and the number of the guard bands.

Subsequently, an operation of the communication apparatus when the process of controlling the guard band is performed is explained below with reference to the drawing. It is configured with the modulator and the demodulator as shown in FIG. 7. The MCS-control modules 7a and 17a in the modulator and the demodulator respectively select the MCS adaptively depending on the transmission path. Then, based on the coding scheme, each of the MCS-control modules instructs the encoding rate to be used to the Rate-control module and the number of the guard bands to be used to the GB-control module.

In this manner, in the present embodiment, to improve the delay-tolerant performance, it is configured to increase the encoding rate and the number of the guard bands. Consequently, in a case where the multipath delay time in the transmission path increases, the radio communication system according to the fifth embodiment can achieve to improve a tolerance to the multipath delay time as a trade-off for a degradation of an error correcting performance due to the increase of the encoding rate, in addition to the same effect as that is in the first embodiment.

INDUSTRIAL APPLICABILITY

As described above, the radio communication system and the communication apparatus according to the present invention are useful in a radio communication system and a communication apparatus that employ the multi-carrier modulation/demodulation method, and particularly effective in the data-transmission-side communication apparatus and the data-reception-side communication apparatus that are capable of working in a communication environment in which the multipath delay time varies.

The invention claimed is:

1. A radio communication system employing a multi-carrier modulation/demodulation method, the radio communication system comprising:
a data-transmission-side communication apparatus including
a mapping unit that executes a mapping process with respect to a data sub-carrier based on a multipath delay time in a transmission path obtained by a predetermined estimating process, and
a guard-band adding unit that changes a number of guard bands to be added to a signal on the data sub-carrier depending on information on the guard band obtained based on the multipath delay time such that the number of guard bands is a function of the multipath delay time obtained by the predetermined estimating process; and
a data-reception-side communication apparatus including
an equalizing unit that suppresses a multipath exceeding a guard interval or suppresses the multipath in a case where the guard interval is not added, based on the information on the guard band obtained based on the multipath delay time, and
a demapping unit that executes a demapping process with respect to an equalized signal based on the multipath delay time,
wherein the guard band is a sub-carrier whose transmitting content is known to the data-reception-side communication apparatus.

2. The radio communication system according to claim 1, wherein the guard-band adding unit increases the number of the guard bands in accordance with an increase of the multipath delay time.

3. The radio communication system according to claim 2, wherein the guard-band adding unit increases the number of the guard bands in accordance with an increase of a maximum amount of the multipath delay time for each of multiple users.

4. The radio communication system according to claim 3, wherein an orthogonal frequency division multiplex access method is employed as the multi-carrier modulation/demodulation method.

5. The radio communication system according to claim 3, wherein an orthogonal frequency and code division multiplexing method or a multi-carrier code division multiple access method is employed as the multi-carrier modulation/demodulation method.

6. The radio communication system according to claim 1, wherein
both the data-transmission-side communication apparatus and the data-reception-side communication apparatus further include a modulation-and-coding scheme selecting unit that selects a modulation and coding scheme adaptively depending on the multipath delay time, and
each of the units included in the data-transmission-side communication apparatus and the data-reception-side communication apparatus executes each process based on the modulation and coding scheme that is selected depending on the multipath delay time.

7. A data-transmission-side communication apparatus employing a multi-carrier modulation/demodulation method, the data-transmission-side communication apparatus comprising:
a mapping unit that executes a mapping process with respect to a data sub-carrier based on a multipath delay time in a transmission path; and
a guard-band adding unit that changes a number of guard bands to be added to a signal on the data sub-carrier depending on information on the guard band obtained based on the multipath delay time such that the number of guard bands is a function of the multipath delay time obtained by a predetermined estimating process,
wherein the guard band is a sub-carrier whose transmitting content is known to a data reception side communication apparatus.

8. The data-transmission-side communication apparatus according to claim 7, wherein the guard-band adding unit increases the number of the guard bands in accordance with an increase of the multipath delay time.

9. The data-transmission-side communication apparatus according to claim 8, wherein the guard-band adding unit increases the number of the guard bands in accordance with an increase of a maximum amount of the multipath delay time for each of multiple users.

10. The data-transmission-side communication apparatus according to claim 7, further comprising:
a modulation-and-coding scheme selecting unit that selects a modulation and coding scheme adaptively depending on the multipath delay time, wherein
each of the units executes each process based on the modulation and coding scheme that is selected depending on the multipath delay time.

11. The data-transmission-side communication apparatus according to claim 7, wherein the guard band is at least one of a null carrier that does not transmit data and a pilot carrier that transmits fixed data.

12. The data-transmission-side communication apparatus according to claim 7, wherein the predetermined estimating process is performed at the data-transmission-side communication apparatus.

13. A data-reception-side communication apparatus employing a multi-carrier modulation/demodulation method, the data-reception-side communication apparatus comprising:
an equalizing unit that suppresses a multipath exceeding a guard interval or suppresses the multipath in a case where the guard interval is not added, based on information on a guard band obtained based on a multipath delay time in a transmission path; and
a demapping unit that executes a demapping process with respect to an equalized frequency signal based on the multipath delay time,
wherein the guard band is a sub-carrier whose transmitting content is known to the data-reception-side communication apparatus.

14. The data-reception-side communication apparatus according to claim 13, further comprising a modulation-and-coding scheme selecting unit that selects a modulation and coding scheme adaptively depending on the multipath delay time, wherein
each of the units executes each process based on the modulation and coding scheme that is selected depending on the multipath delay time.

* * * * *